United States Patent Office 3,319,419
Patented May 16, 1967

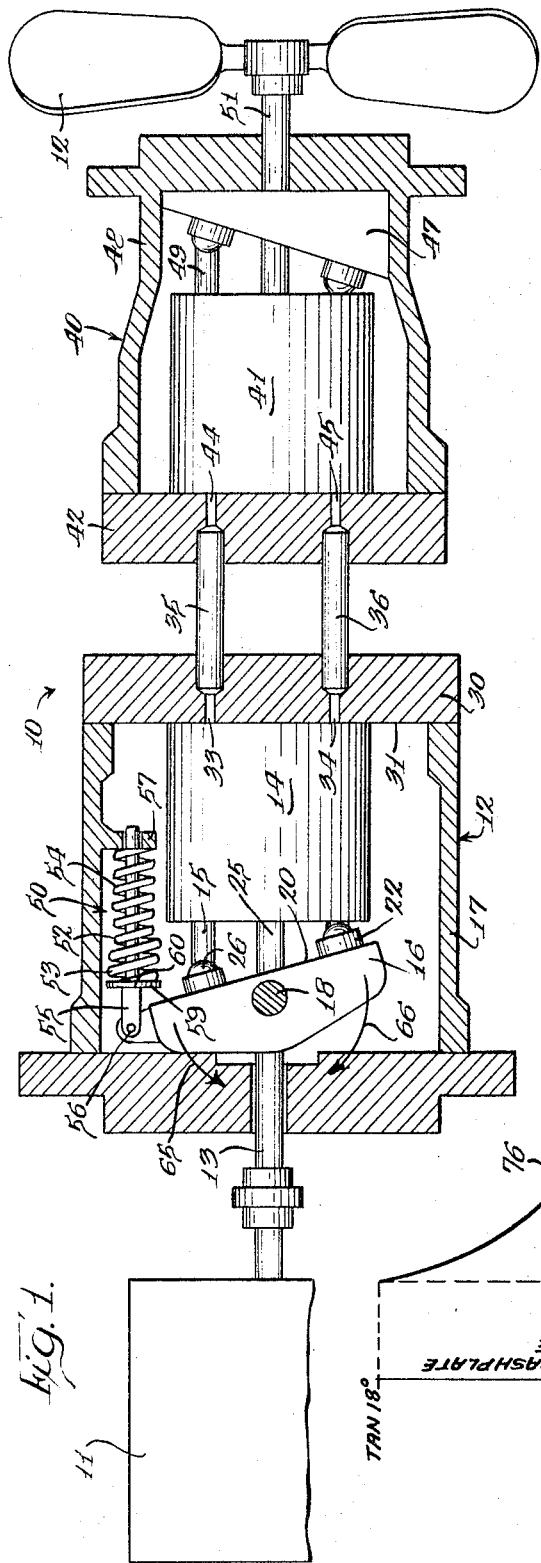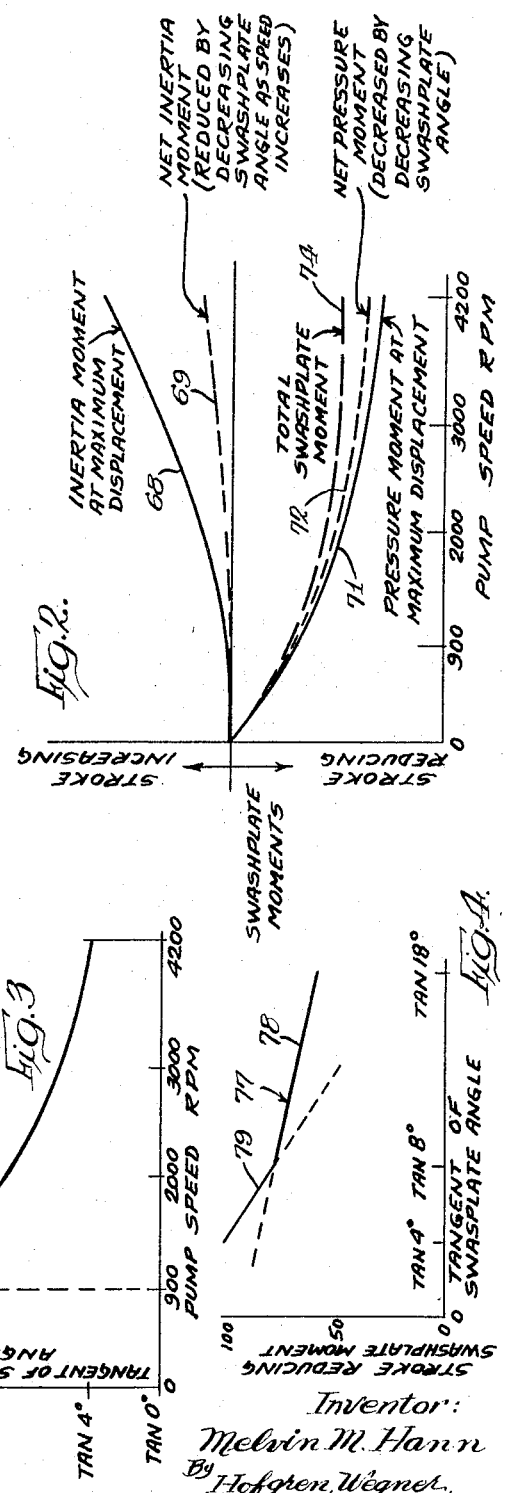

3,319,419
CONSTANT SPEED DRIVE
Melvin M. Hann, Rockford, Ill., assignor to Sundstrand Corporation, a corporation of Illinois
Filed Aug. 3, 1965, Ser. No. 476,829
9 Claims. (Cl. 60—53)

This invention relates to constant speed drives and more particularly to a control system for a hydraulic transmission to maintain a constant output speed therefrom.

In the past, constant speed hydraulic transmissions have been provided with various control means, such as a displacement control servo responsive to output speed or hydraulic flow conditions for varying the angle of the swashplate of one of the hydraulic units in the hydraulic transmission. An example of one of these prior control constructions is a hydraulic transmission having an orifice for sensing the flow delivered from a hydraulic pump to a hydraulic motor. The sensing means actuates a servo valve that controls the flow of control fluid to a servo cylinder which positions a displacement control swashplate in the pump to maintain a constant output flow of fluid to the motor. These prior systems have the disadvantage that they are expensive and complicated.

With this background, the present invention more specifically relates to a simplified control system for varying the position of a swashplate in a multiple axial piston hydraulic pump with varying input speed to achieve a constant output flow of fluid from the hydraulic pump, or a constant output speed from a hydraulic motor coupled to the hydraulic pump and driving a load. The present control system utilizes the inherent inertial and pressure moments on the swashplate of an axial piston hydraulic pump to obtain a constant pressure and flow of fluid from the hydraulic unit. The general mode of obtaining a constant speed drive or a constant flow of fluid from a multiple piston hydraulic transmission is to decrease the displacement of the hydraulic unit serving as a pump in the transmission as the input shaft speed increases, and conversely, to increase the displacement of the pump as the input shaft speed decreases.

The reciprocating pistons in an axial piston hydraulic unit produce known moments on the cam member or swashplate which control the displacement of the hydraulic unit. One of these moments is a fluid pressure moment caused by variations in the force of the fluid within the cylinders on the pistons as the cylinders pass from one port to the other in the hydraulic unit. The other is an inertia moment caused by the deceleration of the pistons at the ends of their strokes. Both of these moments vary with input shaft speed and also with changes in the angle of the swashplate. The present applicant has found that by providing a means for exerting a moment on the swashplate equal and opposite to the sum of the moments exerted on the swashplate by the pistons, the swashplate will automatically assume a position where the hydraulic unit will deliver a constant flow over a wide range of input speeds.

The total moment exerted on the swashplate of an axial piston hydraulic unit by the pistons in a nonlinear function of the swashplate angle for varying input speed in a constant flow or constant speed drive. The present means for balancing these moments to produce such a constant flow system therefrom necessarily produces a moment on the swashplate which is also a nonlinear function of the swashplate angle. To achieve this result, applicant has provided a compound spring which exhibits different spring rates in different ranges of swashplate movement. This compound spring is connected to bias the swashplate in a direction tending to increase the displacement of the multiple piston hydraulic unit as the total swashplate moment produced by the pistons tends to reduce the displacement of the hydraulic unit. In this manner, the spring balances the moments on the swashplate caused by the pistons over a wide range in input speeds to achieve a constant output flow hydraulic unit and a constant speed drive.

It is, therefore, a primary object of the present invention to provide a new and improved axial piston hydraulic unit which will in response to changes in the moments exerted on the swashplate of the hydraulic unit by the pistons vary the displacement of the hydraulic unit over a wide range of input speeds to deliver a constant flow of fluid to a load.

A further object of the present invention is to provide a new and improved hydrostatic transmission of the type described employing an axial piston hydraulic swashplate pump in which a control means responsive to variations in the moments exerted on the swashplate by the reciprocating pistons produces a constant output speed from the transmission.

A further object of the present invention is to provide a new and improved constant speed drive for a fan including a variable displacement hydraulic pump adapted to deliver fluid to a hydraulic motor connected to drive the fan in which a variable rate compression spring varies the displacement of the hydraulic pump by balancing the moments exerted on the swashplate by the reciprocating pistons.

A still more specific object of the present invention is to provide a hydrostatic transmission of the type generally including an aixal piston pump and a fluid motor for driving an output shaft, an input shaft adapted to be driven by a variable speed prime mover for driving the pump, the pump being of the type including an adjustable swashplate engaging the pistons for varying the displacement of the pump, said swashplate being adapted to reciprocate the pistons in the pump to thereby produce a force on the swashplate from the pistons due to fluid acting against the ends of the pistons, which increases with increasing input shaft speed, the swashplate also bearranged so that the forces caused by the acceleration and deceleration of the pistons produce a second moment on the swashplate, the first and second moments on the swashplate producing a net fluid moment which is nonlinear with variations in input shaft speed, and control means for varying the position of the swashplate for maintaining a constant output shaft speed including a spring having two series-connected coils exhibiting a nonlinear spring rate, with the control means constructed so that the spring acts on the swashplate for exerting a counterblancing moment thereon in opposition to the net moment so that the swashplate varies the displacement of the axial piston hydraulic unit as the input shaft speed varies to maintain a constant flow therefrom and a constant output shaft speed.

Other objects and advantages will become readily apparent from the following detailed description taken in connection with the accompanying drawings, in which:

FIG. 1 is a diagrammatic illustration showing a hydrostatic transmission connected to drive a fan and embodying the principles of the present invention;

FIG. 2 is a graph showing the moments on the swashplate of the variable displacement hydraulic unit in FIG. 1 as a function of input shaft speed;

FIG. 3 is a graph illustrating the relationship between the tangent of the swashplate angle and the input shaft speed to maintain a constant speed output in the transmission of FIG. 1;

FIG. 4 is a graph showing the total stroke-reducing moment on the swashplate caused by the pistons as a function of the tangent of the swashplate angle for the transmission of FIG. 1.

While an illustrative embodiment of the invention will be described in detail hereinafter, it is to be understood that the embodiment illustrated is an exemplification of the principles of the invention and is not intended to limit the invention to the embodiment illustrated. The scope of the invention will be pointed out in the appended claims.

Referring to FIG. 1, a hydrostatic transmission generally designated by the numeral 10 is driven by a suitable prime mover 11 and drives a fan 12 at a constant speed. The fan may be used in an air conditioning unit, but other uses for the transmission and for the control thereof will be apparent to those skilled in this art.

The prime mover 11 drives a variable displacement axial hydraulic unit 12 through an input shaft 13. It should be understood that the prime mover 11 and the input shaft 13 are adapted to rotate within a speed range and do not rotate at a constant speed. As illustrated, the axial piston hydraulic unit 12 is adapted to function as a pump delivering motive fluid under pressure. A rotating cylinder block 14 has a plurality of annularly arrayed cylinders therein which receive pistons 15 adapted to slide in the cylinders. An adjustable cam or swashplate member 16 is mounted in housing member 17 for pivotal movement about trunnion 18. The swashplate 16 has a camming surface 20 for driving the pistons 15 into the cylinders in the cylinder block through suitable slippers 22 universally engaging the ends of the pistons 15. It should be understood that suitable means is provided for maintaining the pistons 15 in engagement with the camming surface 20 during the fluid intake stroke of the pistons as they withdraw from the cylinders in the cylinder block 14. Such a mechanism may include a collar surrounding portion 25 of the input shaft 13 and engaging the right ends of the spherical balls 26 on the pistons 15. Suitable resilient means may be provided for resiliently urging such a collar to the left providing an effective piston return mechanism.

As the cylinder block 14 rotates, the pistons 15 deliver fluid through and receive fluid from two symmetrical arcuate ports (not shown) formed in a valve plate 30. The valve plate 30 has a valving surface 31 slidably engaging the right end surface of the cylinder block 14. The arcuate ports are connected to passages 33 and 34 in the valve plate which communicate with conduits 35 and 36 leading to a fixed displacement axial piston motor 40. While the motor 40 is illustrated as being of the axial piston type, it should be understood that other types of fluid motors may be employed in its stead, such as a gear motor.

The hydraulic motor 40 includes a cylinder block 41 rotatably mounted on a motor valve plate 42 having arcuate ports therein similar to those in valve plate 30, which communicate with conduits 35 and 36 through passages 44 and 45. Cylinder block 41 slidably engages the valve plate 42 and selectively receives and delivers fluid through passages 44 and 45 to and from the variable displacement pump 12. A fixed cam 47, mounted in pump housing 48, reciprocates suitable pistons 49 in cylinders in the motor cylinder block 41. High pressure fluid in one of the passages 44 or 45 pushes pistons 49 to the right which by the action of the fixed cam 47 produces rotation of the cylinder block 41 and an output shaft 51 suitably fixed to the cylinder block 41.

A control generally designated by the numeral 50 is provided for controlling the position of the swashplate 16 to maintain a constant output speed in shaft 51 and a constant flow of fluid in one of the conduits 35 or 36, whichever is the high pressure conduit. It should be understood that the control 50 will accomplish this result over a range of input shaft speeds, i.e. over a range of speeds of the prime mover 11. The control 50 is adapted to decrease the angle of inclination of the camming surface 20 with respect to a plane normal to the input shaft 13 as the speed of the input shaft 13 increases. Conversely, the control 50 is effective to increase the angle of the camming surface 20 with respect to the plane normal to the input shaft 13 as the speed of the input shaft 13 decreases to maintain a constant flow of fluid from the variable displacement hydraulic unit 12 and a constant speed in the output shaft 51.

The control 50 includes a compound spring 52 having a first coil 53 and a second coil 54 connected in series. A cylindrical rod 55 is pivotally connected to the swashplate 16 by a pin 56 and is slidably mounted in a boss 57 extending inwardly from the housing. One end of the spring 52 engages the boss 57 and the other end of the spring reacts against a washer 59 seated on a shoulder 60 on the rod 55. In this manner, the spring 52 acting through rod 55 biases the swashplate 16 in a stroke-increasing direction, i.e. a counterclockwise direction indicated by the numeral 65.

The pistons 15 produce a net moment on the swashplate 16 in a stroke-reducing direction, i.e. in a clockwise direction indicated by the arrow 66. For a constant pressure system this net moment varies both with the input shaft speed of shaft 13 and with the displacement of the hydraulic unit 12. The spring 52 is constructed in accordance with the calculated constant pressure piston moments at all swashplate angles so that the moment produced by the spring 52 substantially balances the piston moment to produce a displacement-to-input speed relationship which will achieve a constant flow from the hydraulic unit 12. For this reason it is necessary to understand the quantitative relationship of the total moment produced by the pistons 15 on the swashplate 16 in a constant pressure system for varying input shaft speeds and also for varying swashplate angles. Changes in swashplate angle must be accounted for because these changes are necessary if the system is to produce constant flow for varying input speeds.

In the variable displacement pump 12 there are two major moments acting on the swashplate 16. These are the inertia moment and the fluid pressure moment. The inertia moment is the net moment caused by the deceleration of the pistons 15 which produce a force tending to rotate swashplate 16 counterclockwise. Referring to FIG. 2 and curve 68, it may be seen that this inertia moment acts in a stroke-increasing direction about trunnion 18, and increases as the speed of the input shaft 13 increases for a given displacement. Curve 68 is based upon increasing input speeds for a constant maximum displacement position of swashplate 16. However, to maintain a constant flow of fluid from hydraulic unit 12 or a constant output speed in shaft 51, the displacement of hydraulic unit 12 must be reduced by rotating the swashplate 16 in a clockwise direction as the input shaft speed increases. Now a decrease in the angle of swashplate 16 decreases the inertia moment as shown by curve 69 which represents the net inertia moment including the effects of increasing input speed and varying swashplate angle to maintain constant flow from the hydraulic unit 12.

The second moment acting on the swashplate 16 through the pistons 15 is in the fluid pressure moment. This moment is produced by the force of the hydraulic fluid in the pump cylinders acting against the pistons 15 which react against the camming surface 20 of the swashplate 16. In a hydraulic unit that has symmetrical arcuate inlet and outlet ports in its valve plate, i.e. valve plate 30, this fluid pressure moment is stroke-reducing and tends to rotate the swashplate 16 in a clockwise direction about trunnion 18. It is stroke-reducing because the pressure rise in the cylinders as they pass from the low pressure port to the high pressure port in the valve plate is slower than the pressure drop in the cylinders as they pass from the high pressure port to the low pressure port.

Referring to FIG. 2, it is seen that the fluid pressure moment increases with the speed of the input shaft 13 as shown by curve 71, when the swashplate 16 is held in its maximum displacement position. However, since the displacement of hydraulic unit 12 varies with speed to maintain a constant flow, the pressure moment curve 71 must be modified to include the effects of changing the displacement of the hydraulic unit 12 to achieve a constant fluid flow from the hydraulic unit. Because the fluid pressure moment increases with pump displacement, the net pressure moment curve 72 is somewhat less than the curve 71 as it represents the fluid pressure moment for varying input speeds and varying swashplate angles to maintain constant flow conditions. It should be noted that all the fluid pressure moments shown in FIG. 2 are based upon a constant fluid pressure, which of course is a desired result of the system.

Summing the net inertia moments represented by curve 69 and the net pressure moments represented by the curve 72, a total swashplate moment curve 74 may be developed for varying input speeds. It is seen from FIG. 2 that the total swashplate moment is stroke-reducing and tends to rotate the swashplate 16 in a clockwise direction toward the neutral or zero displacement position. It should be noted that the total swashplate moment represented by curve 74 is a nonlinear function of input speed.

Reference is herein made to Hann et al. Ser. No. 113,697, filed May 31, 1961, now Patent No. 3,230,893, issued Jan. 25, 1966, assigned to the same assignee as the present invention for a more complete description of the inertia and fluid pressure moments acting on a swashplate of an axial piston hydraulic unit.

In a constant speed or constant flow device of the character described with a variable displacement pump changes in swashplate angle are necessary to maintain constant flow conditions for input shaft speeds varying within the design speed range. This is represented graphically in FIG. 3 wherein the tangent of the swashplate angle is plotted against the speed of the input shaft 13 for a speed range of 900 to 4200 r.p.m. The resulting curve 76 is merely exemplary of one particular size and design of hydraulic unit and it should be understood that this curve will vary depending upon the particular axial piston hydraulic unit selected, as will the curves shown in FIG. 2. Thus, pump speed may be expressed in terms of the tangent of the swashplate angle for a constant motor speed output. The control spring 52, in conjunction with the piston moments acting on the swashplate 16, maintains the swashplate angles shown in FIG. 3 for input speeds within the design range shown.

Referring to FIG. 4, the total swashplate moment represented by curve 74 in FIG. 2 is plotted against the tangent of the swashplate angle and is seen to be a nonlinear function thereof. Curve 77 is essentially the same function as curve 74 in FIG. 2 but expressed in terms of swashplate angle rather than input speed in accordance with the constant speed or constant flow relationship set forth in FIG. 3. This is a design convenience in computing the necessary force of spring 52 as will appear hereinafter. It should be understood that in moving to the right on the abscissa in FIG. 4 the input speed is decreasing. Spring 52 is designed so that it exerts a moment on the swashplate equal and opposite to the total swashplate moment 77 produced by the pistons 15.

The tangent of the swashplate angle has been selected for representation in FIG. 4 because the tangent closely approximates the stroke of spring 52 in accordance with obvious trigonometrical relationships. For slow speeds and swashplate angles between 18 degrees and 8 degrees, the spring 52 exerts a stroke-increasing moment on swashplate 16 at a rate approximately equal to the slope of line 78. This is accomplished by the larger coils 53 which deflect first as the swashplate moves from the maximum displacement position toward the neutral position. During this range of movement the coil 54 acts as a rigid body and does not influence the spring rate of coils 53. However, from 8 degrees to 4 degrees the coil 53 is fully compressed and behaves like a solid rigid body and the change in moment of the spring 52 is determined by the rate of the smaller coil portion 54, which of course is different from the rate of coil 53. In this manner coil 53 determines the spring rate in the low speed range and the coil 54 determines the spring rate in the high speed range. The rate of spring 54 is approximately equal to the slope of line 79 in FIG. 4 which represents the piston moment in that range.

In this manner the spring 52 exerts a nonlinear moment on the swashplate 16 as a function of swashplate angle which is equal and opposite to the total piston moment as a function of swashplate angle as shown in FIG. 4.

The operation of the control means 50 is believed obvious from the above description but it will be described briefly as follows. As the speed of the input shaft 13 increases above 900 r.p.m., the stroke-reducing moment exerted by the pistons 15 on the swashplate 16 will increase as represented by curve 74 in FIG. 3. This moment will cause the swashplate 16 to rotate in a clockwise direction about the trunnion 18 to decrease the displacement of the hydraulic unit 12 until the predetermined constant flow is achieved in one of the conduits 35 or 36. During this rotation, the force of the spring 52 increases thereby increasing its moment about trunnion 18 counterbalancing the increased moment produced by the pistons 15. When constant flow is regained, the total piston moment equals the total spring moment and the swashplate will come to a halt. If the input speed of shaft 13 increases above approximately 2000 r.p.m., the total swashplate moment exerted by the pistons again increases, further reducing the displacement of swashplate 16 to maintain constant flow from the hydraulic unit 12. The further compression of spring 52 produces an increasing moment on the swashplate 16 until it equals the increased piston moment at which time the swashplate 16 will again stop. If the input speed decreases, the net stroke-reducing moment decreases and the spring increases the swashplate angle to maintain constant flow and pressure.

Certain types of loads exhibit the characteristic that the horsepower to drive them increases as the cube of the speed thereof, and therefore an increase in the speed of the load will require an appreciable change in the torque necessary to drive the load. An example of a load which exhibits this characteristic is a fan, such as commonly used in air conditioning units. If such a load is driven by a hydraulic transmission having a hydraulic pump and a hydraulic motor, changes in load speed require significant changes in the pressure between the hydraulic motor and the hydraulic pump. Conversely, limited differences in pressure result in only insignificant speed variations. Thus, even if the spring rate does not identically fit the net moment curve, the system may be relied upon for driving a load like a fan.

In this manner a simple but effective constant torque control system has been provided by applicant which may be employed in a hydraulic constant speed drive for a rotating load such as a fan. The spring 52 counterbalances the inherent moments on the swashplate caused by the pistons to achieve the correct input speed to displacement ratio necessary to achieve constant flow conditions. The resulting control system is significantly less expensive than control systems heretofore provided for achieving a constant speed drive or a constant pressure system, for varying input speeds.

I claim:

1. A constant flow control system for a variable displacement hydraulic unit, comprising, an input shaft adapted to be rotated at varying speeds by a prime mover, a hydraulic unit adapted to deliver fluid, means for varying the displacement of the hydraulic unit, the fluid in said hydraulic unit exerting moments on said displacement varying means, and control means responsive to said moments for controlling the displacement varying means to maintain a substantially constant volume flow of fluid from said hydraulic unit regardless of input shaft speed variations.

2. A constant flow control system as defined in claim 1 wherein said means for varying the displacement of the hydraulic unit includes a pivotally adjustable swashplate member, and said control means includes a resilient spring connected to bias said swashplate member and exert a counterbalancing moment thereon in opposition to said fluid moments.

3. A constant flow control system for a variable displacement hydraulic unit, comprising, an input shaft adapted to be rotated at varying speeds by a prime mover, a hydraulic unit adapted to deliver fluid, means for varying the displacement of the hydraulic unit including a pivotally adjustable swashplate member, the fluid in said hydraulic unit exerting moments on said displacement varying means, and control means responsive to said moments for controlling the displacement varying means to maintain a substantially constant volume flow of fluid from said hydraulic unit regardless of input shaft speed variations, said control means including a resilient spring connected to bias said swashplate member and exert a counterbalancing moment thereon in opposition to said fluid moments, said resilient spring being a compression spring having a plurality of spring rates constructed so that the variations in fluid moments with changes in input shaft speeds will be counterbalanced by changes in spring moments due to the multiple spring rates.

4. A constant flow control system as defined in claim 3, wherein said compression spring includes two coil spring portions arranged in series each having a different diameter.

5. A hydrostatic transmission, comprising, an input shaft adapted to be driven by a variable speed prime mover; an axial piston hydraulic unit driven by said input shaft and adapted to deliver fluid, said hydraulic unit including a swashplate for varying the displacement of the hydraulic unit, said swashplate being adapted to reciprocate the pistons in said hydraulic unit so that the forces of the fluid against the pistons produce a first moment on the swashplate which increases with increasing input shaft speed and so that the forces caused by the deceleration of the pistons produce a second moment on the swashplate, said first and second moments producing a net third moment on the swashplate which is nonlinear with variations in input shaft speed; a hydraulic motor connected to receive fluid from said hydraulic unit, an output shaft driven by said hydraulic motor; and control means varying the position of said swashplate for maintaining a constant output shaft speed including means responsive to said third moment on the swashplate for exerting a counterbalancing moment on said swashplate which is nonlinear with variations in input shaft speed, in opposition to said third moment so that the swashplate varies the displacement of the axial piston hydraulic unit as the input shaft speed varies to maintain a constant flow therefrom and a constant output shaft speed.

6. A hydrostatic transmission as defined in claim 5, wherein said control means includes spring means biasing said swashplate in a displacement increasing direction.

7. A hydrostatic transmission as defined in claim 6, wherein said spring means includes two series-connected coil compression spring portions, each of said portions having a different spring rate so that the moment exerted by the spring on the swashplate varies at a first rate in a predetermined range of movement of the swashplate, and at a second rate in another range of movement of the swashplate thereby to compensate for variations in the third moment on the swashplate caused by the pistons which, for constant flow and varying input speed, varies nonlinearly in said ranges of movement of the swashplate.

8. A hydrostatic transmission as defined in claim 7, including a fan driven by said output shaft.

9. A hydrostatic transmission, comprising, an input shaft adapted to be driven by a variable speed prime mover, an axial piston hydraulic unit driven by said input shaft and adapted to deliver fluid, said hydraulic unit including a swashplate for varying the displacement of the hydraulic unit, said swashplate being adapted to reciprocate the pistons in said hydraulic unit so that the forces of the fluid acting against the pistons produce a stroke reducing first moment on the swashplate which increases with increasing input shaft speed and so that the forces caused by the deceleration of the pistons produce a smaller stroke increasing second moment on the swashplate, said first and second moments producing a net stroke reducing third moment on the swashplate which increases with and is nonlinear with variations in input shaft speed, a hydraulic motor connected to receive fluid from said hydraulic unit, an output shaft driven by said hydraulic motor, and a spring biasing said swashplate in a stroke increasing direction, said spring having spring rates such that the spring counterbalances the third moment produced at constant flow from the hydraulic unit with varying input shaft speeds to maintain a constant output shaft speed, said spring including two series connected coil compression spring portions each having a different spring rate.

References Cited by the Examiner

UNITED STATES PATENTS

| 3,190,232 | 6/1965 | Budzich | 103—162 |
| 3,196,616 | 7/1965 | Date et al. | 60—53 |

EDGAR W. GEOGHEGAN, *Primary Examiner.*

PO-1050
(5/69)

UNITED STATES PATENT OFFICE
CERTIFICATE OF CORRECTION

Patent No. 3,319,419          Dated May 16, 1967

Inventor(s) Melvin M. Hann

It is certified that error appears in the above-identified patent and that said Letters Patent are hereby corrected as shown below:

Column 1, line 4, cancel "Illinois" and insert

--Delaware--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents